United States Patent [19]

Elliott et al.

[11] 4,090,012

[45] May 16, 1978

[54] ELECTROCHEMICAL HEAT ENGINE

[75] Inventors: Guy R. B. Elliott, Los Alamos; Charles E. Holley, Alcalde, both of N. Mex.; Barton L. Houseman, Cockeysville, Md.; Wilmer L. Sibbitt, Jr., Albuquerque, N. Mex.

[73] Assignee: The United States of America as represented by the United States Department of Energy, Washington, D.C.

[21] Appl. No.: 794,297

[22] Filed: May 5, 1977

[51] Int. Cl.² .................... H01M 10/34; H01M 10/39
[52] U.S. Cl. ........................................ 429/20; 429/17
[58] Field of Search .................................... 429/17, 20

[56] References Cited

U.S. PATENT DOCUMENTS

| 3,031,518 | 4/1962 | Werner et al. | 429/17 |
| 3,374,120 | 3/1968 | Lawson | 429/20 |
| 3,455,744 | 7/1969 | Werth et al. | 429/17 |
| 3,741,809 | 6/1973 | Anbor | 429/20 |

Primary Examiner—John H. Mack
Assistant Examiner—H. A. Feeley
Attorney, Agent, or Firm—Dean E. Carlson; Paul D. Gaetjens

[57] ABSTRACT

Electrochemical heat engines produce electrochemical work, and mechanical motion is limited to valve and switching actions as the heat-to-work cycles are performed. The electrochemical cells of said heat engines use molten or solid electrolytes at high temperatures. One or more reactions in the cycle will generate a gas at high temperature which can be condensed at a lower temperature with later return of the condensate to electrochemical cells. Sodium, potassium, and cesium are used as the working gases for high temperature cells (above 600 K) with halogen gases or volatile halides being used at lower temperature. Carbonates and halides are used as molten electrolytes and the solid electrolyte in these melts can also be used as a cell separator.

7 Claims, 5 Drawing Figures

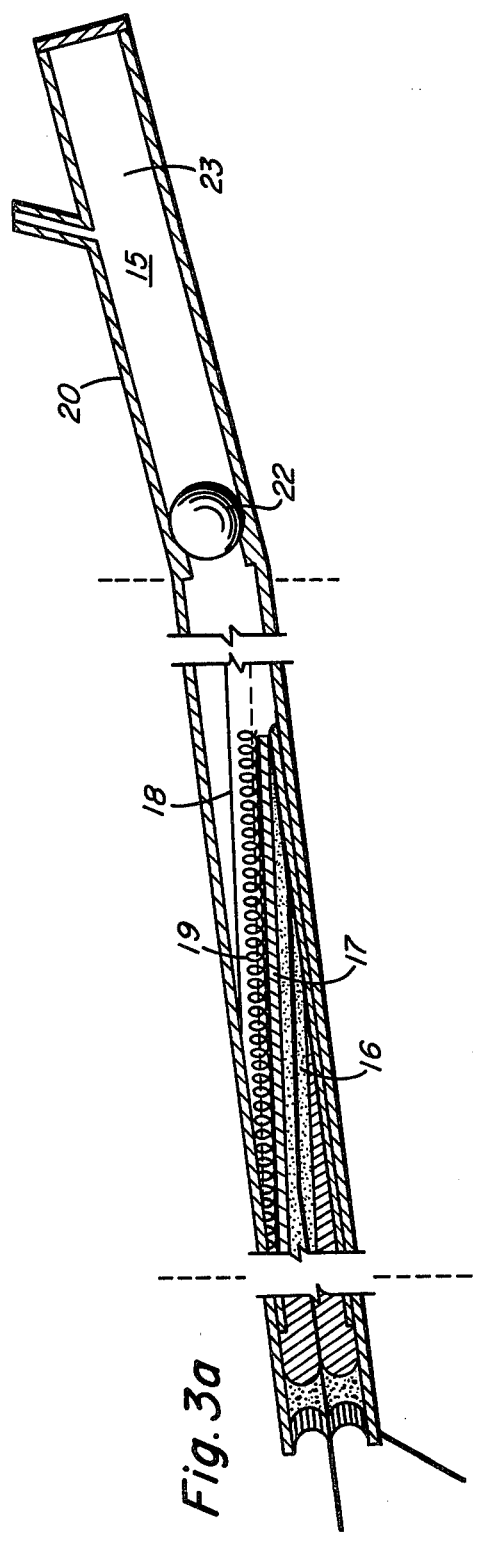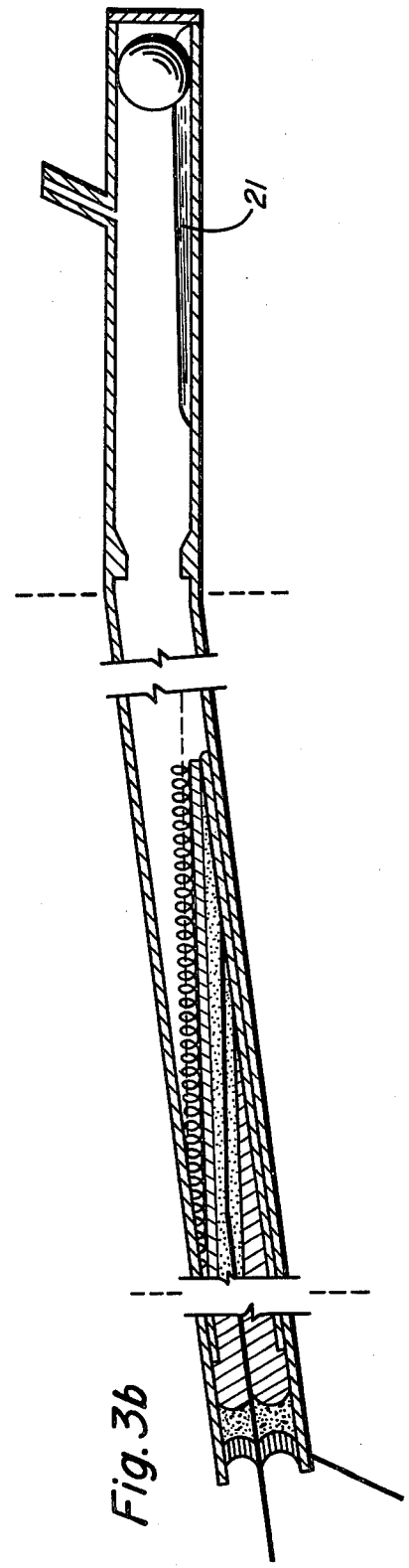

ELECTROCHEMICAL HEAT ENGINE

BACKGROUND OF THE INVENTION

1. Field of the Invention

The thermodynamic concept associated with electrochemical heat engines is that the free energy change of a reaction can be altered by changing the activities of the reactants or products. The following equation describes such activities or products, using accepted thermodynamic symbols:

$$\Delta G = \Delta H - T\Delta S$$
$$= \Delta G^\circ + RT \ln\left(\frac{a^v_{prod}}{a^v_{react}}\right)$$
$$= n \mathcal{F} \epsilon$$

This equation describes the influences of variations of activity upon the values of $\Delta G$ and of $\epsilon$ which is the voltage associated with an electrochemical cell reversibly carrying out the reaction. As noted, one way to change an activity is to change the pressure of a gas and such pressure changes are the basis of operation of the electrochemical heat engines of this invention. An electrochemical cell discharges and delivers a larger voltage than is required for the same cell to be recharged. To achieve this voltage gain, heat must be converted to work and that work must be used to assist the electrochemical charging reaction. A discharge reaction is selected in which one of the reactants exhibits a high vapor pressure at the cell temperature, and the discharge reaction is carried out at that high pressure. During recharging, the system pressure is sharply lowered by cooling a condenser which is in vapor contact with the cell but is far enough away from the cell so that the original cell temperature can be maintained. Under these conditions the volatile reactant is regenerated by electrochemical reaction but immediately moves as a vapor to the condenser where it collects as a condensed phase. The pumping action of the condenser assists the electrochemical recharging reaction. Prior to discharge the system pressure is again built up by heating the condenser. The introduction of this nonelectrochemical step in the cell cycle permits the discharge voltage to be greater than the recharging voltage, i.e., during discharge there is no action comparable to the pumping action occurring during recharge. In the cycle the heat of vaporization is supplied at the high temperature during the recharging reaction and heat of condensation is discharged and removed at the condenser temperature. Also heat equal to the difference in the $\Delta G$ values for the discharge and for the recharging reactions is supplied at the high temperature. In terms of the heretofore stated equation, the pressures, activities, and changes of entropy and free energy are very different for the electrochemical reaction in its discharging and in its recharging directions.

The reversible work per cycle which can be recovered from any heat engine cycle is determined by the equation $(T_1 - T_2)/T_1$, where $T_1$ is the absolute temperature at which heat is supplied to the engine and $T_2$ is the temperature at which heat is exhausted. An electrochemical engine's $T_1$ and $T_2$ are set by the vapor pressure of the working fluid being used, i.e., if the pressure and temperature are too high, then containment and/or heat transfer cannot be handled adequately. If the pressure and temperature are too low, the working fluid cannot be transferred fast enough from the cell to the condenser during recharging. The maximum pressure of an electrochemical cell is about 25 atm and the minimum pressure is about $10^{-4}$ atm. Although too low a condenser temperature is not necessarily harmful to engine operation, the Carnot limit associated with the low temperature will not be approached because the corresponding pressure cannot be maintained in a working engine if the pumping speed is too low. The $\Delta G^\circ$ in the equation cancels between the forward and the reverse reactions and therefore the voltage difference between charge and discharge reflects the properties of the working fluid but is independent of the cell reaction selected. The cell reaction becomes very important if the cells are to be used as energy storage devices as well as electrochemical engines. There are advantages to generating comparatively large voltages per cell per cycle. The equation indicates that larger voltages are associated with high vs. low temperatures, monatomic vs. polyatomic gases, and univalent vs. polyvalent species in the ions generated from the working fluid of an electrochemical engine.

2. Prior Art

A. "Regenerative EMF Cells," Advances in Chemistry Series 64. This symposium reported on considerable work on chemical cells but did not recognize the versatility and applicability of electrochemical heat engines as opposed to simple thermally regenerative cells. This symposium reported only one limited and unpromising treatment of a cycle somewhat similar to the cycles described and claimed in this invention. The investigators disclosed a very poorly designed system utilizing lead-iodine, and therefore their cycle required excessive heating of the working fluid, iodine, while generating power at an exceedingly slow rate, and their anticipated efficiency fell far below the Carnot efficiency. Actually, if properly conceived, this type of electrochemical heat engine cycle can approach the Carnot ideal because no substance except the essential working fluid is heat cycled.

B. U.S. Pat. No. 3,458,356, J. T. Kummer et al., describes a method of generating electrical energy wherein a molten alkali metal at a first temperature and pressure in a first reaction zone is converted to cations with electron loss to electrical circuit in electrical communication with the alkali metal in said first zone, said cations pass through a cationic conductive barrier to mass fluid transfer to a second and significantly lower pressure and temperature in a second reaction zone and are reconverted to elemental form upon electron acceptance from said electric circuit within the said second zone. Thus, U.S. Pat. No. 3,458,356 describes a different class of electrochemical cycle wherein a pressure gradient created by a temperature gradient must be maintained across a solid ionic conductor. In practice (because of the limited number of such solid ionic conductors, largely of the beta-aluminum oxide class) such electrochemical cycles are almost entirely limited to sodium ion conduction. The electrochemical heat engine of this invention is operable with a large variety of liquid electrolytes and, as a consequence, has a much greater versatility as to heat ranges, heat sources, generator construction, etc.

3. Utility

Electrochemical heat engines provide a new method of generating electric power, and they can also be used for energy storage. Among numerous possible uses, when coupled with existing devices such as steam turbines they offer increased power generation efficiencies; for solar applications they offer both efficient energy conversion and storage of electric power, a combination which is not provided by other single devices. It is believed that such electrochemical engines can produce electricity at prices comparable to those from other energy conversion systems being proposed or in operation. The use of mixed alkali carbonates as opposed to pure carbonate as the molten electrolyte as will be described in the preferred embodiments greatly increases the feasible temperature ranges of the electrochemical heat engines of this invention. The extension of the temperature ranges makes for more versatile and more efficient heat engine operations and thus for the production of cheaper electricity while permitting use of heat sources at a wider variety of temperature ranges.

SUMMARY OF THE INVENTION

An electrochemical heat engine is described that works on the cyclic decomposition and reformation of chemical compounds, comprising means for electrolyzing the said chemical compounds at temperatures higher than ambient, and as high as 1600 K, and means for discharging the electrolytic products. These chemical compounds are formed from components of which one or more are volatile at the operating temperature of the particular electrochemical heat engine being used for electric power generation, and these compounds include (1) the oxides of sodium, potassium, or cesium, (2) the iodides, bromides, or chlorides of silver, copper, lithium, and cadmium, and (3) highly volatile halides of tin and iron. Electrolytes may be mixtures of alkali carbonates to which small amounts of fluorides may be added, or low-melting mixtures containing alkali halides to which salts of the cell reactants have been added. The electrodes used in electrochemical cells include alkali metals wetting onto felts of more noble metals, halogen gases or volatile halides wetting onto porous graphite, copper-cuprous oxide, and iron-ferrous oxide.

BRIEF DESCRIPTION OF THE DRAWINGS

FIG. 3 shows in cross section an electrochemical cell with the embodiment preferred for use in high temperature fires such as for topping steam turbine electric power generators. Both charging mode (FIG. 3b) and discharging mode (FIG. 3a) are shown.

DESCRIPTION OF THE PREFERRED EMBODIMENT

Figure 1:
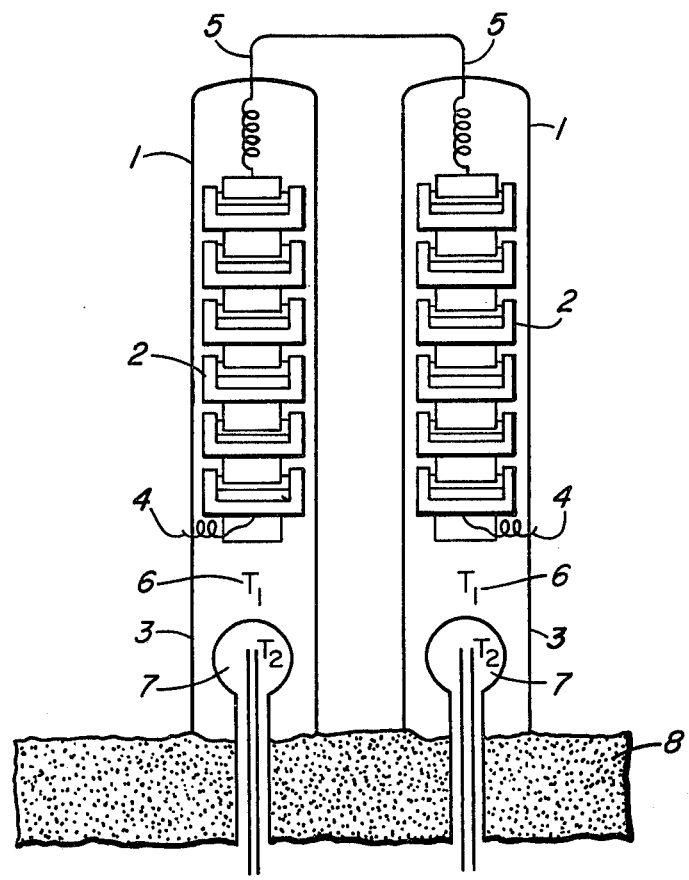
FIG. 1 is a diagrammatic view showing multiple electrochemical cells as used with the embodiment of this invention which is preferred for low temperature solar applications.

FIG. 1 shows diagrammatically an electrochemical engine and indicates the cell and engine construction. This electrochemical engine consists of two identical batteries 1 with six cells 2 per battery being shown. Each battery is evacuated and sealed in Pyrex 3. No chemicals can enter or leave either battery, but heat and electric current can flow. In FIG. 1 each battery 1 contains six identical cells 2 and the six cells are stacked in electrical series. These cells permit the electrochemical reaction of silver with iodine whereby silver iodide is formed, and the cells also allow silver iodide to be electrolyzed back to silver and iodine. For electrochemical engine operation, these identical batteries are connected in electrical opposition. Here the battery positives 4 are connected to each other and the battery negative 5 can be connected across an external load. In an alternative configuration, the battery negatives can be connected to each other with the battery positives being connected across the load. An electrochemical engine like that in FIG. 1 can be operated when the cells are heated to about 250° C. As long as the engine is at a single temperature 6 throughout, no voltage is delivered to the external load. However, if a coolant such as air at room temperature is circulated through one of the condensers 7, passing through the insulation 8, located at the bottom of each battery 1 and outside of the evacuated regions, then a voltage difference develops between the two batteries.

Figure 2:
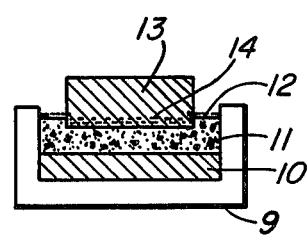
FIG. 2 shows an individual cell of FIG. 1.

FIG. 2 shows in cross section an individual cell of the type used in FIG. 1. Silver nitrate is heated to melt and then decompose on a porous carbon disk 10 press-fitted into a dense graphite cup 9. This silver becomes the cell anode. Next a Pyrex or silica glass tube (not shown in the drawing) sometimes is inserted in the cup as an additional cathode insulator. Silver iodide 11 is then melted in the cup 9 and several disks of glass tape 12 are placed in the melt. After solidification but while still hot, a cathode disk 13 of porous graphite is hot-pressed onto the glass tape 12. The glass tape serves as a typical separator, holding electrolyte but preventing electronic conduction between anode and cathode within the cell. The electrolyte uses a mixture of KI-AgI 14 (eutectic 238° C). This electrolyte reacts KI with $I_2$ to form solutions of $KI_3$. Pure AgI in the lower portions of the cell forms a solid separator and KI-AgI forms a liquid electrolyte in the cathode region. The formation of $KI_3$ solutions is useful in several ways. The iodine (as $KI_3$ in nearly constant KI-AgI liquid composition) is able to distribute from a single condenser in each battery to the several cells of that battery in roughly equal amounts. The iodine is available for reaction at the surfaces of contact between molten electrolyte and the large area porous graphite. With solid AgI all the reaction has to take place very near the lines of contact between $\alpha$-AgI, porous graphite, and $I_2$ in the gas phase. Finally, the existence of a liquid phase helps to remove reaction products from the cathode region during discharge and return them to the cathode during recharge.

The cell reactions are described in Table I. Note that a nonelectrochemical reaction to reform $KI_3$ in solution takes place during the switching period when a recharged battery is being prepared for the discharge phase of its cycle. This sort of mixture of electrochemical and nonelectrochemical steps in a cell cycle is necessary if the discharge voltage is to be greater than the charging voltage. Cells constructed in 2-cm-i.d. cups using the latter technique show internal resistances under drain of about 12 Ω; on recharging the internal resistance is about 36 Ω. Reduction of the internal resistances of cells of electrochemical engines, of course, is important.

Table I

| AgI ELECTROCHEMICAL ENGINE REACTIONS | |
|---|---|
| Discharge Reaction | |
| $KI_{3(soln)} + 2Ag_{(s)} = 2AgI_{(s)} + KI_{(soln)}$ | at $T_1$ |
| Charge Reactions | |
| $2AgI_{(s)} = 2Ag_{(s)} + I_{2(vapor)}$ | at $T_1$ |
| $I_{2(vapor\ at\ T_1)} = I_{2(s\ at\ T_2)}$ | |
| Switch Reaction | |
| $I_{2(s\ at\ T_2)} = I_{2(l\ at\ T_1)}$ | |

Table I-continued

AgI ELECTROCHEMICAL ENGINE REACTIONS
$I_{2(l)} + KI_{(soln)} = KI_{3(soln)}$ at $T_1$ Table II indicates thermodynamic calculations of ideal, no-drain behavior of silver reacting electrochemically with iodine. One cell temperature but two $I_2$ pressures have been used; the pressures are associated with the presence or absence of a condenser at lower temperature and in vapor contact with the cell. Each pressure is associated with a cell voltage, and the voltage difference is delivered when the cell operates at infinitesimal drain as an electrochemical heat engine. On the other hand, if the cell is being used purely as an energy storage device, then the larger voltage is delivered. The α-form of AgI which is stable above 146° C is an excellent electrolyte, conducting $Ag^+$.

TABLE II

THERMODYNAMICS FOR AgI ENGINE

| $2Ag_{(s)} + I_{2(g)} = 2AgI_{(s)}$ Discharge conditions | $\Delta G_{500} = -31200$ cal/mole Charge conditions |
|---|---|
| Cell 500 K | Cell 500 K |
| Condenser 500 K | Condenser 298 K |
| $P_{I_2}$ 2.45 atm | $P_{I_2}$ $4.04 \times 10^{-4}$ atm |
| $\Delta G_{500} = \Delta G°_{500} - + RT \ln P_{I_2}$ $= -31200 - 890 = 32090$ cal/mole | $\Delta G_{500} = \Delta G°_{500} - + RT \ln P_{I_2}$ $= -31200 - 7762 = 23438$ cal/mole |
| $\epsilon_{discharge} = \dfrac{-\Delta G}{n \mathscr{F}} = 0.70\ V$ | $\epsilon_{charge} = 0.51\ V$ |

Being a solid, it can also be a cell separator to prevent mixing of the anodic and cathodic materials, and finally, it is the product of the reaction of silver and iodine.

An embodiment preferred with fires of fossil fuels is represented in FIG. 3 which shows an electrochemical engine in its discharging mode, FIG. 3a, and in its charging mode, FIG. 3b. In the discharging mode the electrochemical cells 15 consist of positive electrode 16, electrolyte 17, and negative electrode 18. As represented in FIG. 3a, cuprous oxide-copper is the discharge positive electrode, but other metal oxide-metal couples could be used (e.g., ferrous oxide-iron or cobaltous oxide-cobalt). The electrolyte 17 will usually be carbonates, fluorides, or their mixtures (e.g., 90% sodium carbonate-10% sodium fluoride). The negative electrode 18 during discharge is shown as molten sodium floating on the upper portion of the nickel felt and contacting the electrolyte. Molten potassium and molten cesium are other anode possibilities. The nickel felt 19 holds the molten alkali metal and serves as the current collector during discharge. Other metals (e.g., iron, copper, or cobalt) and other forms (e.g., wools or mattes) could substitute for the nickel felt. When the cell is charging, the nickel felt 19, wet by electrolyte, itself acts as the electrode. As shown, sodium forms on the nickel felt 19, acting as the negative electrode, and immediately vaporizes away. Potassium and cesium behave similarly in their appropriate temperatures of operation. The reaction for the case of sodium and cuprous oxide in an electrochemical heat engine is as follows:

$$2Na_{(l)} + Cu_2O_{(s)} = N_2O_{(s)} + 2Cu_{(s)}$$

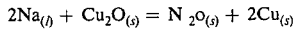

(in carbonate electrolyte)

$Cu_2O$ is not significantly soluble in $Na_2\text{-}CO_3$-base electrolytes and is a good oxidizer in this case. Within the temperature range of 700-1300 K, analogous reactions take place with potassium and cesium at the discharge negative electrode 18 and with various other discharge positive electrodes. The voltages vary with the different negative and positive materials. Charging and discharging conditions are made different through the access or closing off of a condenser 20 at lower temperature by means of ball 22 and nitrogen pressure 23. During charging the condenser is open, and consequently, volatile liquid sodium cannot exist stably in the 1300 K region. As sodium is formed during charging electrolysis, it vaporizes immediately to the open condenser at 700 K and the condenser temperature sets the sodium vapor pressure of $1.12 \times 10^{-3}$ atm. Following the charging electrolysis, the liquid sodium 21 at 700 K is returned to the electrochemical cell at 1300 K and the condenser is isolated by the ball and pressure. As the sodium heats to 1300 K its vapor pressure rises to 3.19 atm prior to carrying out the discharge reaction. The electrochemical heat engine takes in heat from an external source during charging, and heat at 1300 K supplies the heat of vaporization for the sodium. The sodium vapor moves into the condenser at 700 K, condenses, and gives up its heat of vaporization. The Carnot limiting percent efficiency is given by (100) (1300 − 700)/(1300) or 46%, and the voltage gain per cycle is given by $$\dfrac{(1.987)(1300)}{(2)(23061)} \ln \dfrac{(3.19)}{(1.12)(10^{-3})} \text{ or } 0.9 \text{ volts}$$

By combining two cells in electrical series, one charging and the other simultaneously discharging during the passage of a single current under the conditions heretofore stated, it is possible to deliver essentially continuous power at a little less than 0.9 volts. When enough current has passed to complete the charging or discharging reactions, then the cell roles are reversed and each cell moves into the next half of its cycle. The same power level is again delivered, but the direction of the current is reversed. Thus, these engines operate continuously except for short times when the switching of roles is going on. Heat is supplied; electric power is generated.

At temperatures above 600 K the monoxides of potassium, sodium, and cesium are uniquely useful in these electrochemical heat engines because (a) the vapor pressures of the metals are high, (b) these metals are relatively insoluble in some molten salt electrolytes, and (c) the stabilities of the oxides are neither too high nor too low for potential cycles.

As the batteries are hooked together to form the electrochemical engine, any current flow simultaneously can do three things: (a) one battery can discharge, but (b) the discharge current simultaneously charges the other battery, and (c) the current can also be used to do external work. The battery temperature must be maintained from heat flow from an external heat source, the heat must be removed at lower temperature by a circulating coolant, and the electrical work is performed at the expense of degradation of heat; therefore, this is a true heat engine and is subject to normal Carnot limitations. In the operation of these electrochemical engines, and considering the battery which is being recharged, the vapor which is formed during recharge of all cells moves through the vapor phase and condenses as a solid at a single condenser. Later, as the condenser is reheated prior to moving to the discharge phase of the cycle, the condensed vapor is returned to the individual cells.

Table III lists alkali metals and halogens useful as working fluids in electrochemical engines.

Table III
WORKING FLUIDS FOR ELECTROCHEMICAL ENGINES

| Fluid | Temperature (K) for various pressures | | Volts per cycle | Carnot limit |
|---|---|---|---|---|
| | 25 atm | $10^{-4}$ atm | | |
| $Na_{(g)} - Na_{(l)}$ | 1680 | 615 | 1.8 | 0.63 |
| $K_{(g)} - K_{(l)}$ | 1580 | 531 | 1.7 | 0.66 |
| $Cs_{(g)} - Cs_{(l)}$ | 1550 | 467 | 1.7 | 0.70 |
| $Cl_{2(g)} - Cl_{2(l)}$ | 325 | 139 | 0.17 | — |
| $Br_{2(g)} - Br_{2(l)}$ | 435 | 203 | 0.23 | — |
| $I_{2(g)} I_{2(l)} - I_{2(s)}$ | 600 | 282 | 0.32 | 0.53 |

The alkali metals are operated as working fluids over large temperature ranges, leading to favorable Carnot limits. The vaporize as monatomic gases, thus producing large entropy changes per atom as the pressures are changed. In the electrochemical cell reactions there is only one electron involved in forming the alkali ions. In addition, the molten salts of the alkali metals are generally good ionic conductors, and eutectics are available to lower the salt melting points. The operating temperature ranges for sodium and potassium correspond with the temperature range for topping steam turbines fired with fossil fuels. Solar towers' temperatures would fall more in the cesium working temperature range. Cesium would also be useful as the working fluid for parabolic cylinder solar collectors which were focused weakly. For the really simple solar collectors, or for the heat from geothermal sources, one would use halogen or volatile halide working fluids. Of the halogens, iodine is the most suitable because it has high vapor pressures at modest temperatures and low vapor pressure around room temperature. If chlorine or bromine were adsorbed on activated charcoal so that they would condense at room temperature with low pressure, then they, too, could be operated in the same temperature range; however, the halogens have poorer Carnot limits and smaller voltages associated with lower temperatures and diatomic gases than the alkali metals. The smaller voltage disadvantage is counteracted by a greater ease in stacking cells into batteries. Volatile halides, e.g., $SnCl_4$ or $FeCl_3$, can also become working fluids, but their relatively large gaseous heat capacities tend to waste heat. In principle, the heat could be recovered, but there are practical difficulties in exchanging the heat.

Sodium carbonate, potassium carbonate, sodium fluoride, and lithium fluoride have favorable electrochemical solvent properties and can be used as electrolytes for high temperature electrochemical heat engines based on $Na_2O$ or $K_2O$ cycles. Cuprous oxide-copper is a uniquely valuable oxide electrode for high temperature electrochemical heat engines. It is an excellent current carrier. Its electrochemical reactions in carbonate melts are rapid and highly reversible. It components are essentially insoluble in carbonate or carbonate-fluoride melts. The components are readily available in high purity. Cuprous oxide has a low free energy of formation so its electrochemical reduction proceeds at low voltage. In addition, it is useful since the cuprous oxide and copper can readily be formed into desired electrode shapes.

For a given temperature the vapor pressures of the alkali metals increase with atomic weight. Thus, the higher the atomic weight, the lower the useful operating temperature for the metals operating as working fluids of electrochemical engines. Such lowering of the working temperatures can be an advantage, depending upon the temperature of an available heat source. However, the oxides of the alkali metals are decreasingly stable with increasing molecular weight, and the cell voltages for reaction, e.g., with $Cu_2O$, can become unworkably small. Addition of a lower molecular weight carbonate can increase the voltage associated with the higher molecular weight alkali metals by allowing reactions such as $$2Cs_{(l)} + Cu_2O_{(s)} + Na_2CO_{3(in\ melt)} = Cs_2CO_{3(in\ melt)} + Na_2O_{(in\ melt)} + 2Cu_{(s)}$$

This reaction has a larger voltage than the reaction $$2Cs_{(l)} + Cu_2O_{(s)} = Cs_2O(in\ melt) + 2Cu_{(s)}$$

Therefore, addition of a lower molecular weight alkali carbonate sometimes permits use of high atomic weight alkali metals at temperatures for which they would otherwise have to be abandoned.

What we claim is:

1. An electrochemical heat engine useful for electric power generation which works on the cyclic decomposition and reformation by electrolysis of chemical compounds comprising at least two cells in electrical series,
   (a) means for electrolyzing the said chemical compounds at temperatures higher than ambient and as high as 1600 K,
   (b) means for assisting the decomposition electrolysis by removing and cooling one of the decomposition products to a temperature lower than the electrolysis temperature,
   (c) means for reheating the cooled decomposition product to the electrolysis temperature,
   (d) means for discharging the electrolytic products, and
   (e) said chemical compounds are formed from components of which one or more are volatile at the operating temperature of the said heat engine.

2. The heat engine of claim 1 wherein the compounds are selected from the class consisting of
   (a) the oxides of potassium and cesium,
   (b) the iodides, bromides, and chlorides of silver, copper, lithium, and cadmium, and
   (c) the high volatile halides of tin and iron.

3. The electrochemical heat engine of claim 1 wherein the means for electrolyzing the said chemical compounds include electrolytes
   (a) that are mixtures of alkali carbonates, and
   (b) low melting mixtures containing alkali halides to which salts of cadmium, silver, tin, and iron have been added.

4. The heat engine of claim 3 wherein fluorides are added to electrolytes of the alkali carbonates.

5. The heat engine of claim 1 wherein the means for electrolyzing the said chemical compounds are selected from the class consisting of
   (a) potassium or cesium metal wetting onto felts of more noble metals,
   (b) halogen gases or volatile halides wetting onto porous graphite, and
   (c) iron-ferrous oxide.

6. The electrochemical heat engine of claim 1 wherein the temperature for electrolyzing the particular chemical compounds is in the range of 600 to 1600 K and said compounds are the oxides of potassium and cesium.

7. The heat engine of claim 1 wherein the said chemical compounds are at temperatures higher than ambient and below 600 K, said compounds being the iodides, bromides, and chlorides of silver, copper, lithium, and cadmium.

* * * * *